Figure 1:
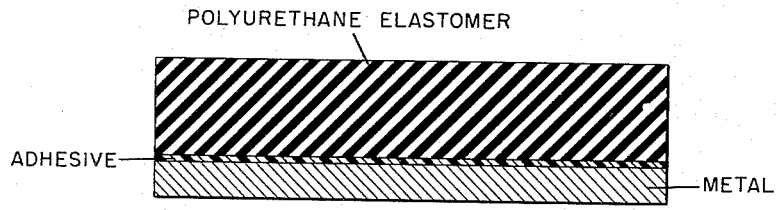

INVENTORS
WILLIAM M. LARSON
HARLAN M. RICE
BY
ATTORNEY

United States Patent Office 2,992,939
Patented July 18, 1961

2,992,939
ADHESIVE PROCESS AND LAMINATES
William M. Larson, Cuyahoga Falls, and Harlan M. Rice, Brecksville, Ohio, assignors to The Goodyear Tire & Rubber Company, Akron, Ohio, a corporation of Ohio
Filed May 21, 1958, Ser. No. 736,716
10 Claims. (Cl. 117—75)

This invention relates to methods for adhering polyurethane polymers to metal and to the laminates of metal and elastomer resulting therefrom. More particularly, it relates to methods for adhering certain liquid reaction mixtures to metal to form laminates of the metal and cured elastomer.

Elastomeric polyurethane products prepared from the reaction of polyisocyanates and polymers containing reactive hydrogen atoms such as polyesters, polyesteramides and polyalkylene ether glycols are well known. Elastomeric polyurethane foams, solid processible polyurethane rubbers and liquid reaction mixtures capable of being cast into molded products have all been described.

The castable reaction mixtures are prepared from polyesters, for example, which are either liquid at room temperature or are capable of being melted at relatively low temperatures and which are mixed with polyisocyanates, and preferably with a diisocyanate, and a crosslinking agent or reticulator such as water, a glycol or a diamine. Other non-reactive ingredients such as fillers or coloring agents may be added, if desired. The advantage of such casting compositions, in addition to their outstanding cured physical properties, is that they can be poured into relatively simple, lightweight molds and cured without the application of the high temperatures and pressures conventionally employed in molding rubber products from the solid natural and synthetic rubbers.

Representative examples of the molded products made from the liquid castable reaction mixtures are solid industrial tires, gaskets, gears, reinforced timing belts, bushings, and other machine components including metal reinforced molded parts for automobiles. The adhesion of these castable urethane compositions to metals is adequate for some purposes even without the use of adhesives. However, it has been observed that when the metal reinforced part is subjected to elevated temperatures, the adhesion of the elastomer to metal is not always satisfactory. At high temperatures a premature failure of the part through a tearing away of the rubber from the metal usually results.

One method for improving the "hot adhesion" of these polymers to metal has been described in United States Patent 2,850,424 issued September 2, 1958 to A. F. Finelli et al. As described therein, a two cement system is employed to provide improved hot adhesion between the elastomer and the metal. This method is generally applicable to all types of castable polyurethane reaction mixtures.

It has now been discovered that a simplified adhesive system can be employed to produce improved hot adhesion between certain specific castable polyurethane reaction mixtures and metal.

The polyurethane reaction mixtures which are employed as the elastomer component in the adhesive process of this invention and which form the elastomer portion of the laminates of this invention have been described in copending application Serial No. 726,644 filed April 7, 1958.

These polyurethane reaction products are prepared from the reaction between ortho dichlorobenzidine which functions as a reticulator or crosslinking agent, 3,3'-dimethyl 4,4'-diphenylene diisocyanate which functions as the curing agent and a liquid polyester prepared from at least one dicarboxylic acid and at least one glycol, the polyester having a molecular weight of from 1500 to 2500, a hydroxyl number of from 45 to 75 and an acid number not greater than 5. The combination of ortho dichlorobenzidine and 3,3'-dimethyl 4,4'-diphenylene diisocyanate reacted with the polyester provides a cured polyurethane composition which has outstanding resistance to softening and deformation at elevated temperatures.

The adhesive employed in forming high-temperature-resistant bonds between the above described polyurethane elastomers and metal is a mixture of (A) a resinous copolymer of from 50 to 80% by weight of styrene and from 50 to 20% by weight of acrylonitrile and (B) polyisocyanates more fully described in United States Patent 2,683,730 and which may be described as mixtures defined by the formula

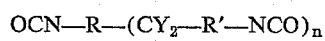
$$OCN—R—(CY_2—R'—NCO)_n$$

in which R and R' are arylene radicals, Y is selected from the group consisting of hydrogen, alkyl and aryl radicals, $n$ is a whole number, and the $—(CY_2—R'—NCO)$ groups in excess of 1 are attached to an R' radical, the mixtures containing at most 40% of the diisocyanate.

These polyisocyanate mixtures are prepared by phosgenating the condensation products of aryl mono primary amines and aliphatic or aromatic aldehydes or ketones. By controlling the molecular ratio of amine to aldehyde or ketone in the range of 4:2.5 to 4:3.5 with the amine being present in the larger molecular amount, a polyisocyanate mixture is produced by subsequent phosgenation in which the diisocyanate is present in the mixture in an amount not to exceed 40% by weight. Preferred polyisocyanate mixtures for use in the adhesive are those obtained by the phosgenation of the polyamines resulting from the condensation of aniline with formaldehyde, benzaldehyde, acetaldehyde, methyl ethyl ketone or acetone; ortho toluidine with formaldehyde, benzaldehyde, methyl ethyl ketone or acetone; ortho anisidine with formaldehyde, benzaldehyde, acetaldehyde, methyl ethyl ketone or acetone; and alpha naphthyl amine with formaldehyde, benzaldehyde, acetaldehyde, methyl ethyl ketone or acetone. It has been found that particularly good results are achieved when the polyisocyanate mixture obtained from the phosgenation of the aniline/formaldehyde condensation product is used in preparing the adhesive.

A particularly effective styrene/acrylonitrile resin useful in preparing the adhesive is one sold by Rohm and Haas Chemical Company under the name "Plexene M" which is believed to be a resin formed from the polymerization of approximately 70 parts by weight of styrene and 30 parts by weight of acrylonitrile.

The weight ratio of polyisocyanate to styrene/acrylonitrile resin in preparing the adhesives of this invention may be varied over comparatively wide limits with from 1 to 300 parts of polyisocyanate mixture per 100 parts of resin being found useful. It is preferred to employ from 10 to 100 parts by weight of polyisocyanate mixture per 100 parts by weight of resin with best results being obtained with adhesives containing approximately 50 parts by weight of polyisocyanate per 100 parts by weight of resin.

The adhesive is made by dissolving the resin and polyisocyanate in an inert solvent which neither enters into nor chemically effects a reaction between the other components of the adhesive. Examples of suitable inert solvents are toluene, ethylene dichloride, methyl ethyl ketone, monochlorobenzene and methylene dichloride. The solids content of the adhesive may be varied from 2 to 40% by weight of the total weight of adhesive with preference being given to adhesives containing from 5 to 20% solids by weight.

In the practice of this invention the adhesive is employed to adhere the polyurethane elastomers to such metals as iron, aluminum, steel, stainless steel, zinc plate, brass and other alloys.

Figure 2:
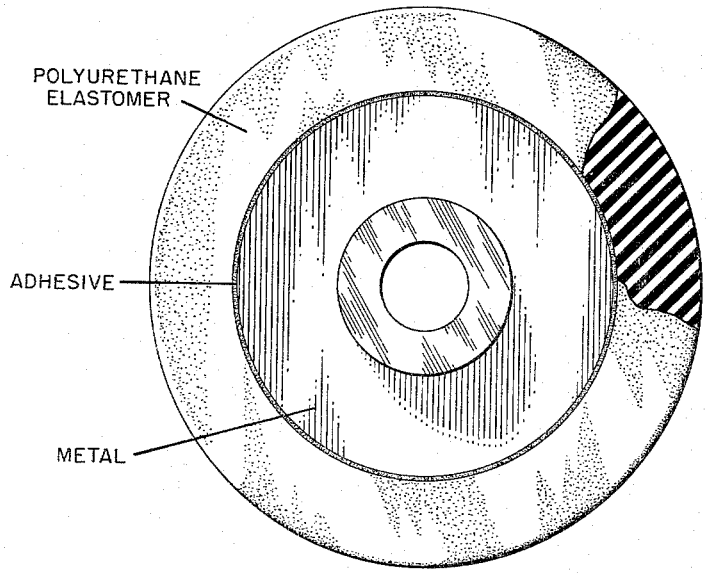

This invention is further illustrated with respect to the accompanying drawing in which FIG. 1 is a cross section of a laminated article showing the polyurethane layer adhered to a layer of metal through the use of the adhesive. FIG. 2 is an elevation of a solid industrial tire in which the polyurethane tread portion is adhered to the metal hub or wheel through the use of the adhesive.

In forming the laminates of this invention the metal surface is first preferably cleaned by a degreasing operation, a chemical cleaning and/or a shot blast or sand blast treatment. Following the cleaning of the metal surface, it is coated with the adhesive which may be applied in any convenient manner such as by dipping, spraying or painting. The adhesive is then permitted to dry after which the liquid polyurethane reaction mixture is cast against the cemented metal surface and permitted to cure. While the polyurethane reaction mixture is capable of curing at room temperatures, it is preferred to heat the laminate for form 15 minutes to several hours at from 100 to 150° C.

The polyesters used in preparing the polyurethane elastomers are those conventionally prepared by the condensation reaction between one or more dicarboxylic acids and one or more glycols. Representative examples of the dicarboxylic acids which may be used in preparing these polyesters are: succinic, glutaric, adipic, pimelic, suberic, azelaic and sebacic. Of these adipic acid and sebacic acid are particularly preferred. Representative examples of the glycols which may be used to prepare the polyesters are ethylene glycol, propylene glycol, butylene glycol, pentamethylene glycol and hexamethylene glycol. Of these, ethylene glycol, propylene glycol and mixtures of these two glycols are particularly preferred.

As indicated above, the polyester should have an average molecular weight of from 1500 to 2500 and a corresponding hydroxyl number of from 45 to 75 with an acid number not greater than 5. The molecular weight range indicated defines polyesters which are of the proper consistency for pouring in the liquid state either at room temperature or at relatively low temperatures, and which yield cured polymers possessing outstanding physical properties. The maximum acid number is recited to eliminate those polyesters which are predominantly carboxyl-terminated which have been found to produce, when reacted with diisocyanate, products more resinous than rubber-like.

Of particular interest are the polyesters prepared from adipic acid and a mixture of glycols containing approximately 80 mol percent of ethylene glycol and 20 mol percent of propylene glycol in the molecular weight range of approximately 2000 and having an acid number not greater than 2.

As is well recognized in the production of polyurethane products, an excess of isocyanate is generally employed to insure the cure of the polyester and to provide sufficient points of reaction with other ingredients containing reactive hydrogen such as ortho dichlorobenzidine. The amount of excess of the diisocyanate, while not critical, is important because the diisocyanate is usually the most expensive ingredient employed in the reaction mixture. Based upon one molecular weight of the polyester it has been found that polyurethane products having outstanding properties are obtained by reacting the polyesters with from 0.10 to .80 mols of ortho dichlorobenzidine and with from 1.25 to 2 mols of 3,3'-dimethyl 4,4'-diphenylene diisocyanate with the diisocyanate always being employed in a molar excess of at least 10% over the combined molecular amount of the dichlorobenzidine and the polyester.

A particularly effective formulation from the standpoint of the physical properties of the cured product and the physical nature of the liquid mixture is one containing approximately 100 parts by weight of a polyester having an average molecular weight of approximately 2000, approximately 6 parts by weight of ortho dichlorobenzidine and approximately 23 parts by weight of 3,3'-dimethyl 4,4'-diphenylene diisocyanate.

The castable polyurethane reaction mixture is prepared by heating the polyester to a temperature of from 100° C. to 140° C., adding the diisocyanate followed by a thorough mixing or blending of the reactants for from 30 to 45 minutes, adding the diamine crosslinker followed by a thorough blending of this reactant into the mixture for approximately 1 minute and by pouring the complete reaction mixture into a mold or onto a casting surface. While the reaction mixture will set up without the application of additional heat, it has been found expedient to place the cast product into a heated air oven or to heat the mold by some other means as for instance in a curing press in order to accelerate the rate of cure of the reaction mixture. The application of pressure during the oven curing operation has been found not to be necessary or required. However, the application of pressure to products cured in a press has been found to produce beneficial results.

The invention is further illustrated by the following examples which are representative rather than restrictive of the scope of this invention and in which parts are shown by weight unless otherwise specified.

EXAMPLE 1

A 70/30 copolymer resin of styrene/acrolonitrile resin (20 parts) was dissolved in ethylene dichloride (80 parts). A polyisocyanate mixture (20 parts) prepared by phosgenating a mixture of polyamine resin prepared from aniline and formaldehyde and having an amine equivalent of approximately 136 was dissolved in 80 parts of ethylene dichloride. A cement was prepared by mixing 5 parts of the polyisocyanate solution with 95 parts of the resin solution. A one inch strip of zinc plated metal was sandblasted and covered with one coat of the adhesive which was permitted to dry. A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.3 was heated at 120° C. for one hour under a vacuum of 20 millimeters of mercury. To this polyester 23 parts of 3,3'-dimethyl 4,4-diphenylene diisocyanate was added. The mixture was stirred for 30 minutes at 120° C. under a vacuum of 20 millimeters of mercury. Ortho dichlorobenzidine (6 parts) was then added and mixed with the polyester and diisocyanate for one minute after which a layer of the liquid reaction mixture was cast against the cemented zinc strip. The coated strip was heated in an air oven at 250° F. for 24 hours after which it was permitted to age at room temperature for 24 hours before adhesion tests were run. Strip adhesion tests were run on the cured sample, the results of which are reported in Table I. The same experiment was repeated using a steel strip in place of the zinc strip. Still additional examples were prepared and tested using varying amounts of the resin and isocyanate solutions. These variations and the adhesion results obtained are reported in Table I, the adhesion results being reported as pounds required to strip a one inch width of elastomer from the metal.

Table I

| Example | Cement composition | | Adhesion to metal | |
|---|---|---|---|---|
| | Resin solution | Isocyanate solution | Zinc plate, pounds | Steel |
| 1 | 95 | 5 | 117 | 75 pounds. |
| 2 | 90 | 10 | 100 | Sample broke. |
| 3 | 80 | 20 | 95 | 85 pounds. |
| 4 | 70 | 30 | 87 | Do. |
| 5 | 60 | 40 | 69 | 69 pounds. |
| 6 | 66 | 33 | 78 | Off scale at 150 pounds. |

In addition to these results other excellent adhesion values are obtained by employing the adhesive of this invention to join the disclosed elastomers to other metals such as iron, aluminum, and brass. The adhesive is particularly effective in the fabrication of solid industrial tires in which the polyurethane elastomer is molded to a metal hub or rim. These tires, subjected to heavy loads, generate considerable heat during use. The method of adhering the rubber to the metal as disclosed and claimed herein provides an industrial tire which holds up outstandingly well under such high temperatures.

While certain representative embodiments and details have been shown for the purpose of illustrating the invention, it will be apparent to those skilled in this art that various changes and modifications may be made therein without departing from the spirit or scope of the invention.

We claim:
1. The method of adhering cast polyurethane polymers to metal which comprises applying to a metal surface an adhesive coating, drying the adhesive, applying to the coated metal surface a liquid reaction mixture comprising (A) a polyester prepared from at least one dicarboxylic acid and at least one glycol, said polyester having a molecular weight of from 1500 to 2500, a hydroxyl number of from 45 to 75 and an acid number not greater than 5, (B) ortho-dichlorobenzidine and (C) 3,3'-dimethyl 4,4'-diphenylene diisocyanate and curing said reaction mixture, said adhesive coating consisting of an inert solvent, a resinous copolymer of 50 to 80 percent by weight of styrene and from 50 to 20 percent by weight of acrylonitrile and a polyisocyanate mixture defined by the formula:

$$OCN—R—(CY_2—R'—NCO)_n$$

in which R and R' are arylene radicals, Y is selected from the group consisting of hydrogen, alkyl, and aryl radicals, n is a whole number, and the $$—(CY_2—R'—NCO)$$

groups in excess of one are attached to an R' radical, said polyisocyanate mixture containing at most 40% of the diisocyanate by weight.

2. The method defined by claim 1 in which the liquid reaction mixture contains approximately 100 parts by weight of polyester, approximately 6 parts by weight of orthodichlorobenzidine and approximately 23 parts by weight of 3,3'-dimethyl 4,4'-diphenylene diisocyanate.

3. The method defined by claim 1 in which the polyester is prepared from adipic acid and a mixture of glycols containing approximately 80 mol percent of ethylene glycol and approximately 20 mol percent of propylene glycol.

4. The method defined by claim 1 in which R and R' are phenylene radicals and Y is hydrogen.

5. The method defined by claim 1 in which the solids content of the adhesive is from 1 to 300 parts by weight of polyisocyanate mixture per 100 parts by weight of resin.

6. A laminated article comprising (A) at least one layer of metal, (B) at least one layer of a polyurethane elastomer, and (C) an adhesive layer between said metal layer and said elastomer layer, said elastomer resulting from the reaction of a mixture comprising (A-1) a polyester prepared from at least one dicarboxylic acid and at least one glycol, said polyester having a molecular weight of from 1500 to 2500, a hydroxyl number of from 45 to 75 and an acid number not greater than 5 (A-2) ortho-dichlorobenzidine, and (A-3) 3,3'-dimethyl 4,4'-diphenylene diisocyanate, and said adhesive layer consisting of a resinous copolymer of 50 to 80 percent by weight of styrene and from 50 to 20 percent by weight of acrylonitrile and a polyisocyanate mixture defined by the formula:

$$OCN—R—(CY_2—R'—NCO)_n$$

in which R and R' are arylene radicals, Y is selected from the group consisting of hydrogen, alkyl, and aryl radicals, n is a whole number, and the $$—(CY_2—R'—NCO)$$

groups in excess of one are attached to an R' radical, said polyisocyanate mixture containing at most 40% of the diisocyanate by weight.

7. A laminated article defined by claim 6 in which the reaction mixture contains approximately 100 parts by weight of polyester, approximately 6 parts by weight of ortho-dichlorobenzidine and approximately 23 parts by weight of 3,3'-dimethyl 4,4'-diphenylene diisocyanate.

8. A laminated article defined by claim 6 in which the polyester is prepared from adipic acid and a mixture of glycols containing approximately 80 mol percent of ethylene glycol and approximately 20 mol percent of propylene glycol.

9. A laminated article defined by claim 6 in which R and R' are phenylene radicals and Y is hydrogen.

10. A laminated article defined by claim 6 in which the adhesive layer contains from 1 to 300 parts by weight of polyisocyanate mixture per 100 parts by weight of resin.

References Cited in the file of this patent

UNITED STATES PATENTS

| | | |
|---|---|---|
| 2,356,005 | Roquemore | Aug. 15, 1944 |
| 2,503,209 | Nyquist et al. | Apr. 4, 1950 |
| 2,625,532 | Seeger | Jan. 13, 1953 |
| 2,647,884 | Wystrach | Aug. 4, 1953 |
| 2,753,276 | Hoppe et al. | July 3, 1956 |
| 2,850,424 | Finelli et al. | Sept. 2, 1958 |